March 27, 1928. 1,663,927
P. VOREAUX
VALVELESS AIR PUMP
Filed June 22, 1925
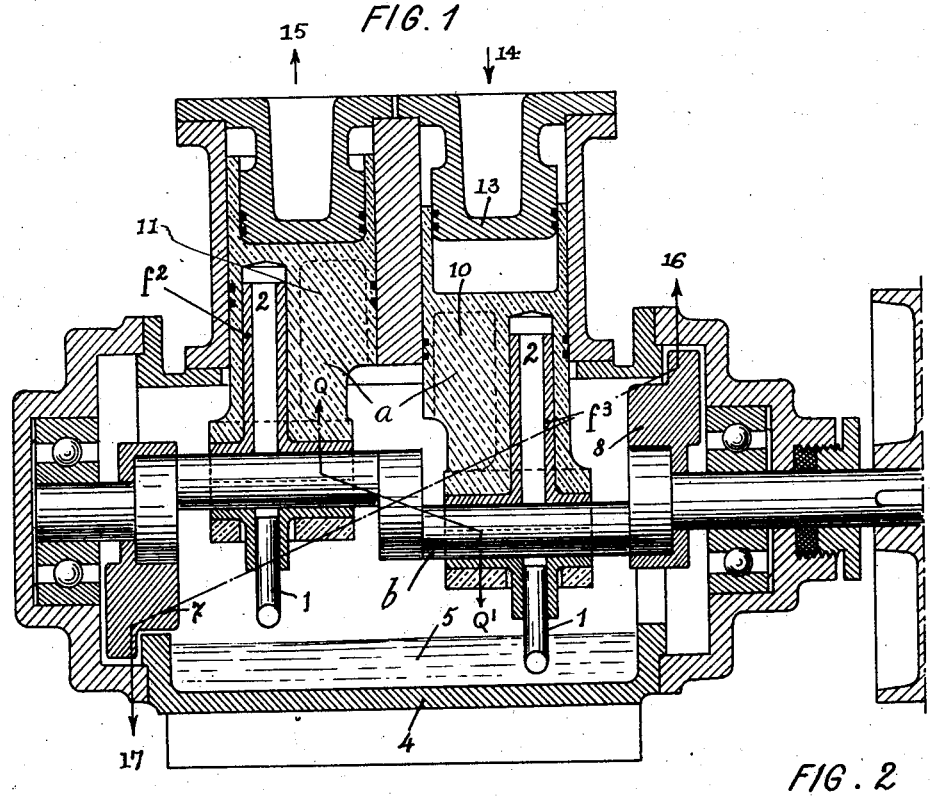
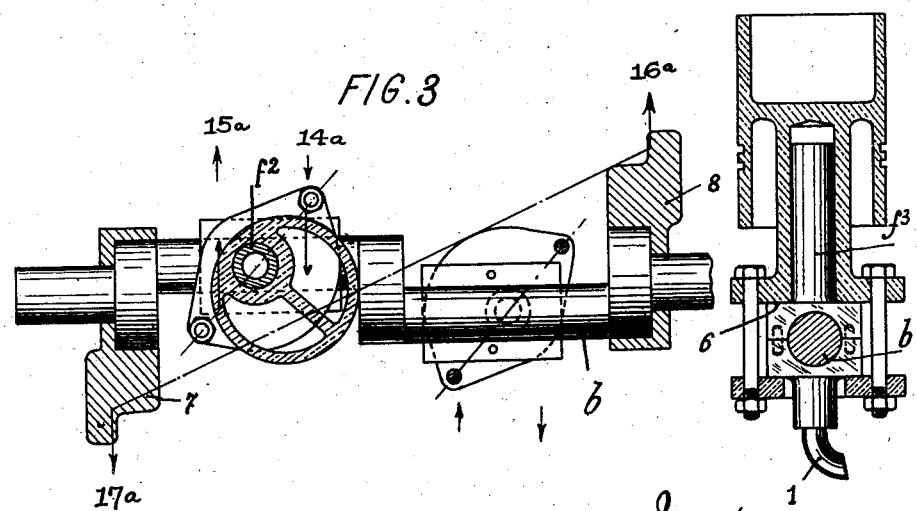
Inventor.
Paul Voreaux,
By [signature] atty Patented Mar. 27, 1928.

1,663,927

UNITED STATES PATENT OFFICE.

PAUL VOREAUX, OF PARIS, FRANCE, ASSIGNOR TO ETABLISSEMENTS SAMGA & BAVOX REUNIS, OF PARIS, FRANCE.

VALVELESS AIR PUMP.

Application filed June 22, 1925, Serial No. 38,792, and in France June 30, 1924.

The present invention has for its object improvements in the air pump forming the subject-matter of my Patent No. 1,645,834, Oct. 18, 1927 and relating to the lubrication of the pivot bearings imparting to the pistons their reciprocating motion, and the movement of rotation effecting the distribution.

According to the present invention, the cylinders of the pump are disposed side by side, instead of occupying the diametrically opposite position, thus leaving free one half of each bearing and permitting to dispose therein a tube which—by dipping into an oil bath in the casing—ensures the lubrication of the said bearing, whereof the hollow pivot allows the oil to rise into its interior.

In order to obtain the equilibration, the pump comprises two cylinders which are placed side by side and pistons therein whose pivots are outside of the space between the axes of the cylinders, and I dispose on the crank shaft at opposite sides of the pair of pistons two eccentric masses producing with the pistons a couple which—in the plane of the axes of the cylinders—equilibrates the couple due to the straight displacement of the pistons, and, in the perpendicular plane, equilibrates the couple due to the movement of rotation of said pistons on their pivots.

The following description, with reference to the appended drawings which are given by way of example, sets forth the manner in which the invention is carried into effect.

Fig. 1 is a sectional view of the pump in accordance with the present invention.

Fig. 2 is a sectional view of a piston at 90°.

Fig. 3 is a plan view, partially in section, of the pistons and the crank.

As observed in the figures, the cylinders and the pistons are disposed side by side, and the pivot bearings $f^2$ $f^3$ are mounted upon the crank pins of the driving crank-shaft $b$ of the pump.

By this disposition I am enabled to disengage the lower part of the pivot bearings and to secure to the latter the scoops 1 leading to the crank pin of the crank, and situating in line with the bored portions 2 formed in the interior of the pivots $f^2$ $f^3$. The pump operating mechanism is enclosed in the casing 4 whose lower part contains the oil bath 5 in which the pipes 1 are immersed when the pistons descend. The scoop lubrication thus produced is most effective, for the oil leaving the scoops 1 will lubricate the crank pins and then, ascending in the conduit 2, will lubricate the friction surface of the pivots and the pistons, as well as the friction surfaces 6 (Fig. 2) of the piston upon the part of the bearing which is perpendicular to the axis of the piston.

As described in said prior application, the pistons $a$ are connected with the crank-shaft $b$ through the medium of the pivot bearings $f^2$, $f^3$ mounted on the crank-pins of said crank-shaft. These pivot-bearings have a slight to and fro movement along the crank pin and it will be noted that no connecting rods are used between the piston and crank-shaft, the pivot bearings being all that is required.

Accordingly it will be understood that a revolution of the crank-shaft $b$ will impart a helical motion to the pistons, which means that each piston will have a reciprocating motion within its cylinder and will oscillate about its own axis. The motion of each of the crank-pins may be considered as resolved into two components, one parallel to the axis of the piston it actuates, and the other at right angles to it. The first of these motions communicated to the piston will reciprocate it while the second motion at right-angles to the axis and at a distance from it oscillates the piston. As the pivot oscillates with the piston it slides back and forth on the crank-pin, the latter being made longer than the bearing of the pivot to provide for this motion.

In the case of the two cylinders shown in the drawings, in order to obtain the equilibration, the eccentric masses 7 and 8 are disposed on either side of the pair of pistons, whereof the pivots $f^2$ $f^3$ are outside of the axes of the cylinders; said masses are in the diagonally opposite position with reference to the centre line of the crank, and their weights and positions are suitably calculated to produce a couple which in the vertical plane (Fig. 1) is opposed to the couple produced by the thrust of the pistons upon the crank in the direction of their straight displacement in the interior of the cylinders. On the contrary, in a plane at 90° to the preceding (Fig. 3), the masses 7 and 8 will produce a couple acting against the resulting couple produced by the movements of rotation of the pistons in the interior of their cylinders.

Obviously, the pistons should be so calculated that the maximum couple resulting from the forces due to the movement of oscillation, and the maximum couple due to the straight movement, shall be equal in the case of multi-cylindrical pumps, the equilibration of the whole apparatus may be ensured by the coupling of groups of two pistons as hereinbefore described.

If one considers the pump in the position represented in Fig. 1, where the piston 10 is in its lowest position, while the piston 11 is in its highest position, the forces of inertia Q and Q' produced by the pistons 11 and 10 form a couple which tends to deform the crank shaft by torsion. In order to avoid this deformation, there are provided the eccentric masses 7 and 8.

These exercise on the crank shaft, because of the action of centrifugal force, efforts directed in the direction of the arrows 16 and 17, efforts which constitute a couple directly opposed to the couples Q and Q'. It suffices to calculate the weight of the masses 7 and 8 in order that the two couples will be destroyed and a perfect equilibrium of the assemblage will be obtained.

An analogous explanation shows that the same masses create in the horizontal plane a couple represented on Fig. 3 by the arrows $16^a$ and $17^a$, which is opposed to the torsion couple created by the helicoidal movement of the piston, a couple which is directed in the direction of the arrows $14^a$ and $15^a$.

It is equally easy to calculate the couples $16^a$—$17^a$ in order that the torsion effort which results on the crank shaft exactly overcomes the torsion effort produced by the couple $14^a$—$15^a$.

Obviously, without departing from the principle of the invention, it may be suitably modified in detail.

The improvement in the lubrication might be applied to a single cylinder or a multi-cylinder pump.

What I claim is:

1. A pump comprising a crank case, two cylinders disposed side by side, pistons co-acting therewith, a crank shaft having two cranks and extending through the said crankcase, eccentric means connecting each piston with the crank and slidable along the latter to impart a helical movement to the pistons in their cylinders, two eccentric masses disposed at the respective sides of the pistons and fixed in diametrically opposed direction on the crank shaft for obtaining the equilibration of the moving parts of the pump, the eccentric masses producing a couple which in the plane of the axis of the cylinders, equilibrates the couple due to the straight displacement of the pistons, and, in a plane perpendicular to the first-mentioned plane, equilibrates the couple due to the movement of rotation of said pistons upon their own axes.

2. A pump comprising a crank case, two cylinders disposed side by side, pistons co-acting therewith, a crank shaft having two cranks and extending through the said crank case, bearings provided with eccentric extensions forming pivots and engaging in said pistons, said bearings connecting each piston with the crank and slidable along the latter thereby causing a helical movement of the pistons in their cylinders, two eccentric masses disposed at the respective sides of the pair of pistons and fixed in diametrically opposed direction on the crankshaft for obtaining the equilibration of the moving parts of the pump, the eccentric masses producing a couple which, in the plane of the axis of the cylinder equilibrates the couple due to the straight displacement of the pistons, and, in a plane perpendicular to the first-mentioned plane, equilibrates the couple due to the movement of rotation of the said pistons upon their own axes.

In testimony that I claim the foregoing as my invention, I have signed my name hereto.

PAUL VOREAUX.